(12) United States Patent
Wurzer et al.

(10) Patent No.: US 11,279,413 B1
(45) Date of Patent: Mar. 22, 2022

(54) SLEEPER PANELS AND CAB PANELS

(71) Applicants: Adam J. Wurzer, Carroll, IA (US);
Terry D. Wurzer, Panora, IA (US);
David T. Wurzer, Carroll, IA (US)

(72) Inventors: Adam J. Wurzer, Carroll, IA (US);
Terry D. Wurzer, Panora, IA (US);
David T. Wurzer, Carroll, IA (US)

( * ) Notice: Subject to any disclaimer, the term of this patent is extended or adjusted under 35 U.S.C. 154(b) by 137 days.

(21) Appl. No.: 16/894,027

(22) Filed: Jun. 5, 2020

Related U.S. Application Data

(62) Division of application No. 15/978,743, filed on May 14, 2018, now Pat. No. 10,752,295.

(51) Int. Cl.
*B62D 25/02* (2006.01)
*B62D 33/04* (2006.01)
*B62D 27/06* (2006.01)
*B62D 33/06* (2006.01)

(52) U.S. Cl.
CPC .......... *B62D 25/02* (2013.01); *B62D 27/065* (2013.01); *B62D 33/0612* (2013.01)

(58) Field of Classification Search
CPC ... B62D 25/02; B62D 27/065; B62D 33/0612
USPC ........................................................ 296/191
See application file for complete search history.

(56) References Cited

U.S. PATENT DOCUMENTS

| | | | | |
|---|---|---|---|---|
| 5,560,673 | A * | 10/1996 | Angelo | B62D 33/0612 180/89.12 |
| 6,120,089 | A * | 9/2000 | Kalstiantz | B21D 5/042 296/186.1 |
| 6,527,334 | B2 * | 3/2003 | Oliver | B62D 35/001 296/1.02 |
| 2007/0221431 | A1 | 9/2007 | Hirsh | |
| 2016/0176449 | A1 * | 6/2016 | Kazakoff | B60J 5/062 296/190.1 |

* cited by examiner

*Primary Examiner* — D Glenn Dayoan
*Assistant Examiner* — Dana D Ivey
(74) *Attorney, Agent, or Firm* — Dennis L. Thomte; Thomte Patent Law Office LLC

(57) ABSTRACT

A sleeper panel is provided for use with each of the passenger and driver sides of a sleeper cab. The entire upper ends of the sleeper panels have a top flange which is secured to the underside of the sleeper cab. Structure is provided to maintain the curved portions of the sleeper panel in their desired radius of curvature. A cab panel is also described which is ideally suited for use on a truck cab so as to be positioned forwardly of the sleeper panels thereby providing an esthetic appearance to the vehicle.

1 Claim, 16 Drawing Sheets

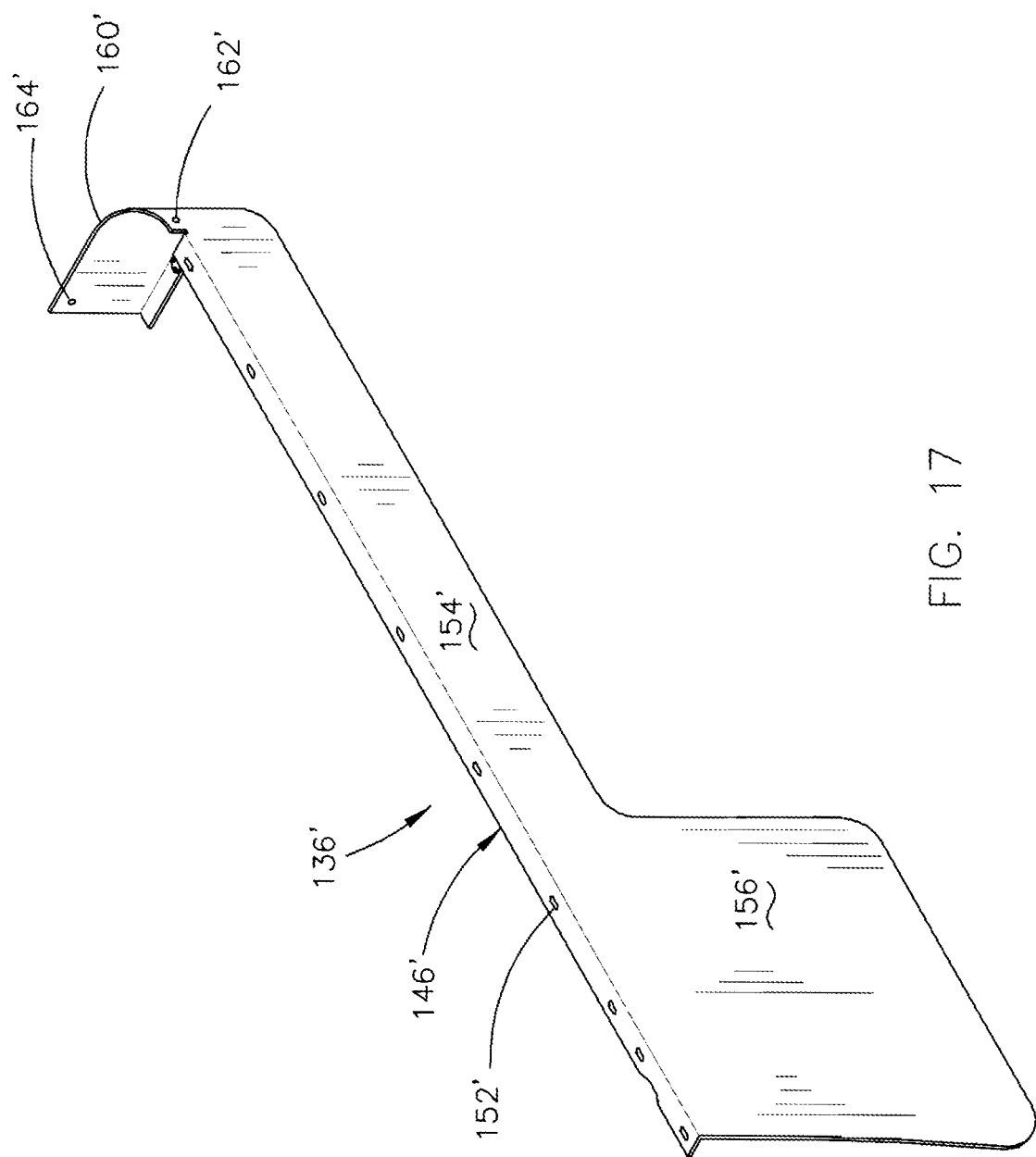

SLEEPER PANELS AND CAB PANELS

CROSS REFERENCE TO RELATED APPLICATION

This is a Divisional Application of application Ser. No. 15/978,743 filed May 14, 2018, entitled SLEEPER PANELS AND CAB PANELS.

BACKGROUND OF THE INVENTION

Field of the Invention

This invention relates to sleeper panels for the sleeper cab of a truck. More particularly, this invention relates to sleeper panels wherein the entire upper end of the sleeper panels are able to be secured to the underside of the sleeper cab. Further, this invention relates to cab panels which are secured to the cab of a truck in a manner which stabilizes the cab panels.

DESCRIPTION OF THE RELATED ART

Many large trucks have sleeper cabs positioned behind the cab of the truck. In most cases, there is a gap below the underside of the sleeper cab and the fuel tank of the truck. In the past, sleeper panels have been provided which are secured to the underside of the sleeper cab of a truck so as to partially close the gap between the underside of the sleeper cab and the fuel tank. Normally, the prior art sleeper panels are secured to the underside of the sleeper cab and have an elongated side portion with forward and rearward ends with a front end member extending inwardly from the forward end of the sleeper panel and a rear end member extending inwardly from the rearward end of the side portion. Since the upper end of the side portion and the upper ends of the front and rear end members of the prior art sleeper panels have horizontally extending flanges extending inwardly from the side portion thereof, it is impossible to bend the front and rear end members so that they extend inwardly at a 90 degree curved angle with respect to the side portion of the sleeper panel. Thus, the flanges at the juncture of the front and rear end members with the side portion of the prior art sleeper panels must be cut-away to enable the front and rear end members to be bent at a 90 degree curved angle with respect to the side portion of the sleeper panel. Thus, the curved portions of the sleeper panel between the side portion and the front and rear end members do not have a flange at the upper end of the curved portions so that the curved portions are not able to be secured to the underside of the sleeper cab. Thus, after time, the sleeper panel will become loose and will not be securely fastened to the underside of the sleeper cab.

In the case of a cab panel, which normally only has one curved portion, the same problem exists.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A pair of sleeper panels are provided for use with a sleeper cab which is positioned rearwardly of the cab of a truck. A pair of cab panels are also provided for use on the sides of the cab of the truck. One of the sleeper panels is positioned at the passenger side of the sleeper cab and the other sleeper panel is positioned at the driver side of the sleeper panel. One of the cab panels is positioned at the passenger side of the truck cab and the other cab panel is positioned at the driver side of the truck cab. The sleeper panel which is positioned at the driver side of the sleeper panel is a mirror image of the sleeper panel secured to the sleeper cab at the passenger side of the sleeper cab. The cab panel secured to the truck cab at the driver side thereof is a mirror image of the cab panel which is secured to the passenger side of the truck cab. The sleeper panels are secured to the truck sleeper cab with the sleeper cab having a forward end, a rearward end, a passenger side, a driver side, an upper end and a lower end. Inasmuch as the sleeper panel which is positioned at the driver side of the sleeper cab is a mirror image of the sleeper panel at the passenger side of the sleeper panel, only the sleeper panel which is positioned at the passenger side of the sleeper cab will be described in detail. The sleeper panel at the passenger side of the sleeper cab includes a forward panel portion having an inner end, an outer end, a vertically disposed side wall having an upper end, a lower end, an inner surface and an outer surface. A top flange extends transversely rearwardly from the upper end of the side wall thereof with the top flange having an upper side, a lower side, an inner end and an outer end. A bottom flange extends transversely rearwardly from the lower end of the side wall with the bottom flange having an upper side, a lower side, an inner end and an outer end. The sleeper panel also includes a first curved panel portion having an inner end, an outer end, a vertically disposed and curved side wall having an upper end, a lower end, an inner side and an outer side. A top flange extends transversely from the upper end of the curved side wall thereof with the top flange thereof having an upper side, a lower side, a first end and a second end. A bottom flange extends transversely from the lower end of the curved side wall thereof with the bottom flange having an upper side, a lower side, a first end and a second end.

The sleeper panel also includes an elongated intermediate panel portion having a forward end, a rearward end, a vertically disposed side wall having a forward end, a rearward end, an upper end, a lower end, an inner side and an outer side. A top flange extends transversely form the upper end of the side wall thereof with the top flange having an upper side, a lower side, a forward end and a rearward end. A bottom flange extends transversely from the lower end of the sidewall thereof with the bottom flange thereof having an upper side, a lower side, a forward end and a rearward end.

The sleeper panel also includes a second curved panel portion having an inner end, an outer end, a vertically disposed and curved side wall having an upper end, a lower end, an inner side and an outer side. A curved top flange extends transversely from the upper end of the curved side wall thereof with the top flange thereof having an upper side, a lower side, a first end and a second end. A curved bottom flange extends transversely from the lower end of the curved side wall thereof with the bottom flange thereof having an upper side, a first end and a second end.

The sleeper panel also includes a rear panel portion having an inner end, an outer end, a vertically disposed side wall having an upper end and a curved lower end. A top flange extends transversely from the upper end of the side wall thereof with the top flange thereof having inner and outer ends.

A first connector plate is secured to and extends between the top flange of the first curved panel portion and the top flange of the intermediate panel portion. A second connector plate is secured to and extends between the bottom flange of the first curved panel portion and the bottom flange of the intermediate panel portion. A third connector plate is secured to and extends between the top flange of the second curved panel portion and the top flange of the intermediate panel portion. A fourth connector plate is secured to and extends between the bottom flange of the second curved panel portion and the bottom flange of the intermediate panel portion.

When the sleeper panel is secured to the underside of the sleeper at the passenger side of the sleeper cab, the entire upper end of the sleeper panel is able to be secured to the underside of the sleeper cab. The connector plates ensure that the radiuses of curvature of the first and second curved panel portions do not change during the operation of the truck.

As stated, the invention also includes a cab panel which is secured to the passenger side of the truck cab and another cab panel which is secured to the driver side of the truck cab. Inasmuch as the cab panel which is positioned at the driver side of the truck cab is a mirror image of the cab panel which is positioned at the passenger side of the truck cab, only the cab panel at the passenger side of the truck cab will be described in detail. The cab panels include a curved end portion which extends inwardly from the rearward end of the cab panel with a connector plate being utilized to maintain the radius of curvature of the rearward end portion of the cab panel. The upper end of the cab panel is secured to the truck cab.

It is therefore a principal object of the invention to provide an improved sleeper panel which may be secured to the passenger side of a sleeper cab.

A further object of the invention is to provide an improved sleeper panel which may be secured to the driver side of a sleeper cab.

A further object of the invention is to provide a sleeper panel wherein the entire upper end thereof may be secured to the underside of the sleeper cab.

A further object of the invention is to provide a sleeper panel which has curved portions at the forward and rearward ends thereof with means being provided to maintain the front and rear curved portions in their curved positions.

A further object of the invention is to provide a sleeper panel which is esthetic in appearance.

A further object of the invention is to provide a cab panel which is secured to the passenger side of the truck cab and a cab panel which is secured to the driver side of the truck cab.

A further object of the invention is to provide cab panels wherein the curved portion thereof will be maintained in position during the life of the cab panel.

A further object of the invention is to provide a sleeper panel which is economical of manufacture, durable in use and refined in appearance.

A further object of the invention is to provide a cab panel which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 17 is an outer perspective view of the driver side cab panel of FIG. 16.

DESCRIPTION OF THE PREFERRED EMBODIMENT

Figure 1:
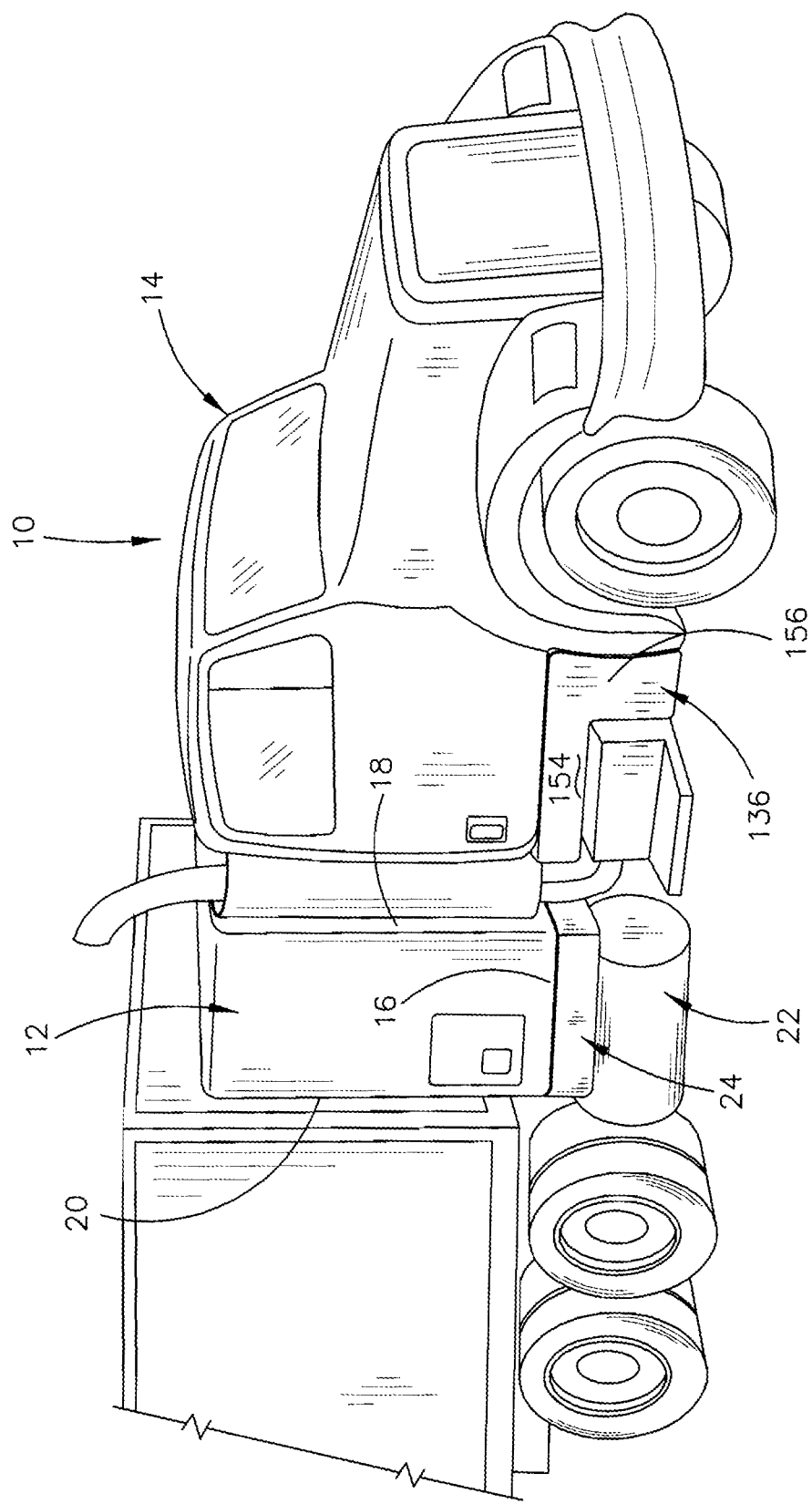
FIG. 1 is a partial perspective view of the passenger side of a truck having the passenger side sleeper panel and the passenger side cab panel of the invention secured thereto.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a truck having a sleeper cab 12 positioned rearwardly of the truck cab 14. The sleeper cab 12 may have many different configurations but will normally have a lower end 16, a forward end 18 and a rearward end 20. The lower end 16 of sleeper cab 12 is positioned above a fuel tank 22 located at the passenger side of the cab 14 rearwardly of the cab 14. Usually there will be another fuel tank located beneath the sleeper cab 12 at the driver side of the truck 10.

Figure 2:
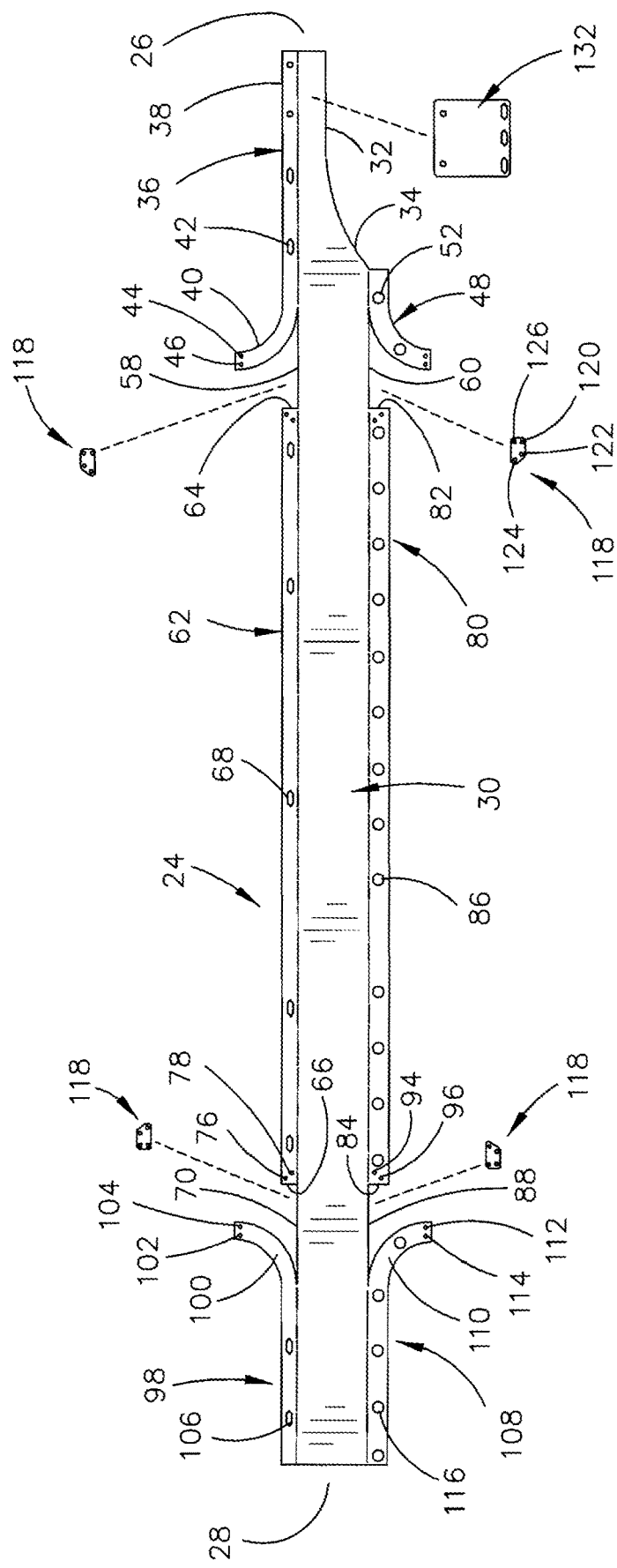
FIG. 2 is a plan view of the passenger side sleeper panel of this invention after it has been cut from a larger sheet of metal material and partially creased.
Figure 3:
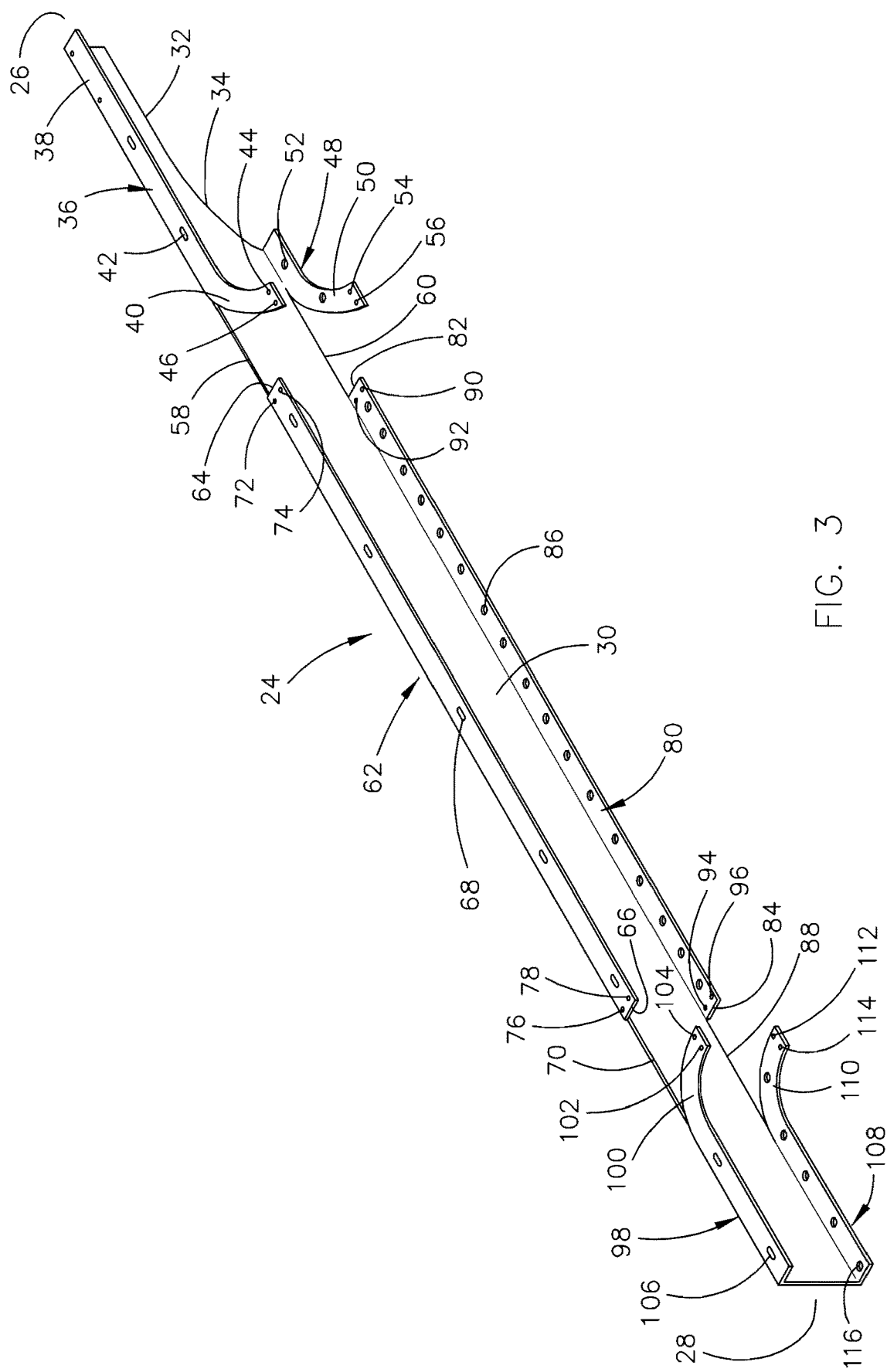
FIG. 3 is a perspective view of the passenger side sleeper panel of FIG. 2 after it has been partially creased.
Figure 5:
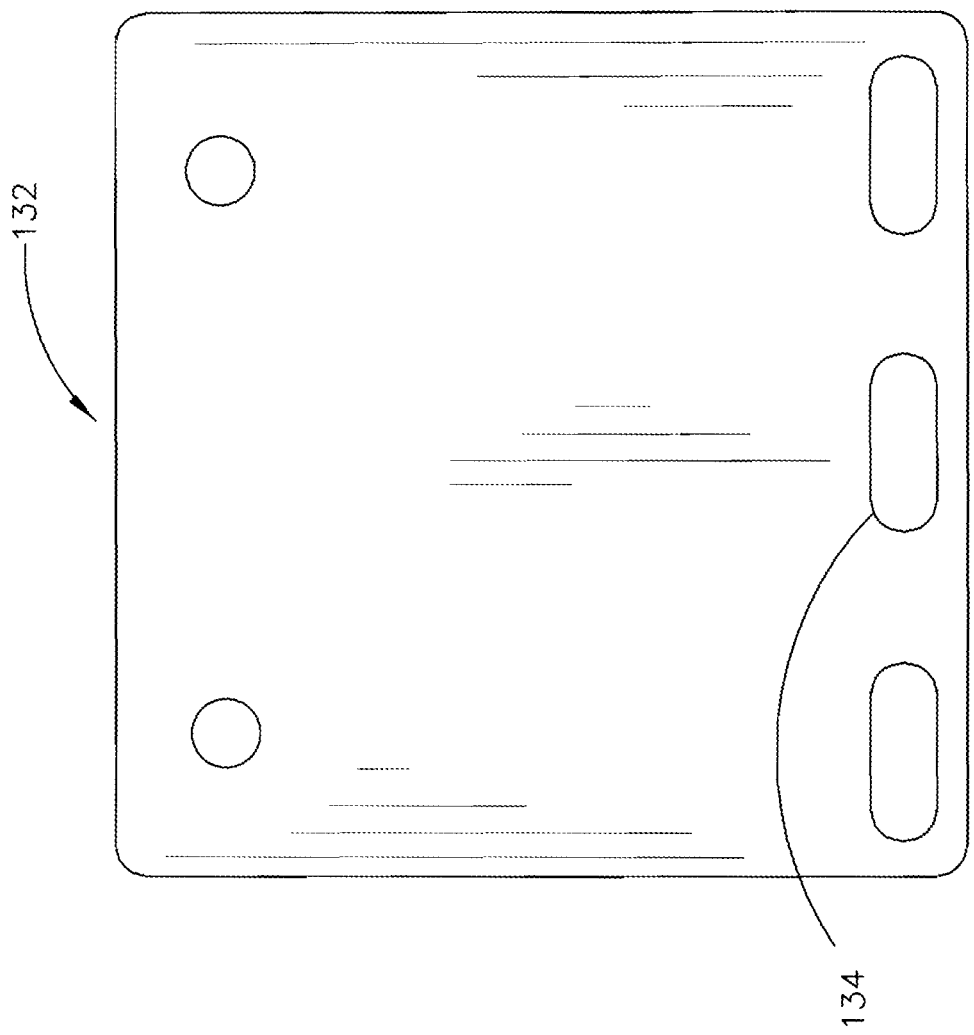
FIG. 5 is a plan view of a connector plate of the invention.
Figure 4:
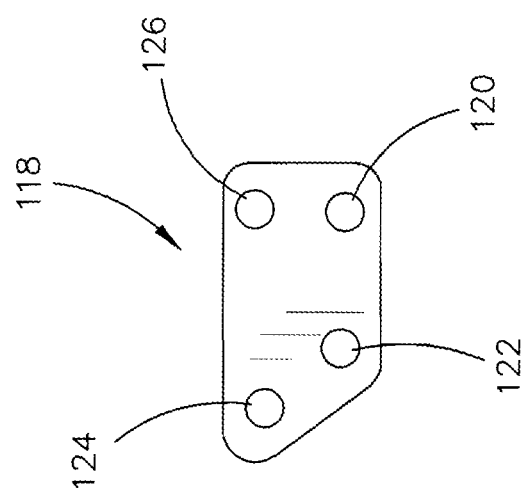
FIG. 4 is a plan view of one of the connector plates of the invention which are used with the passenger side sleeper panel, the passenger side cab panel, the driver side sleeper panel and the driver side cab panel.
Figure 6:
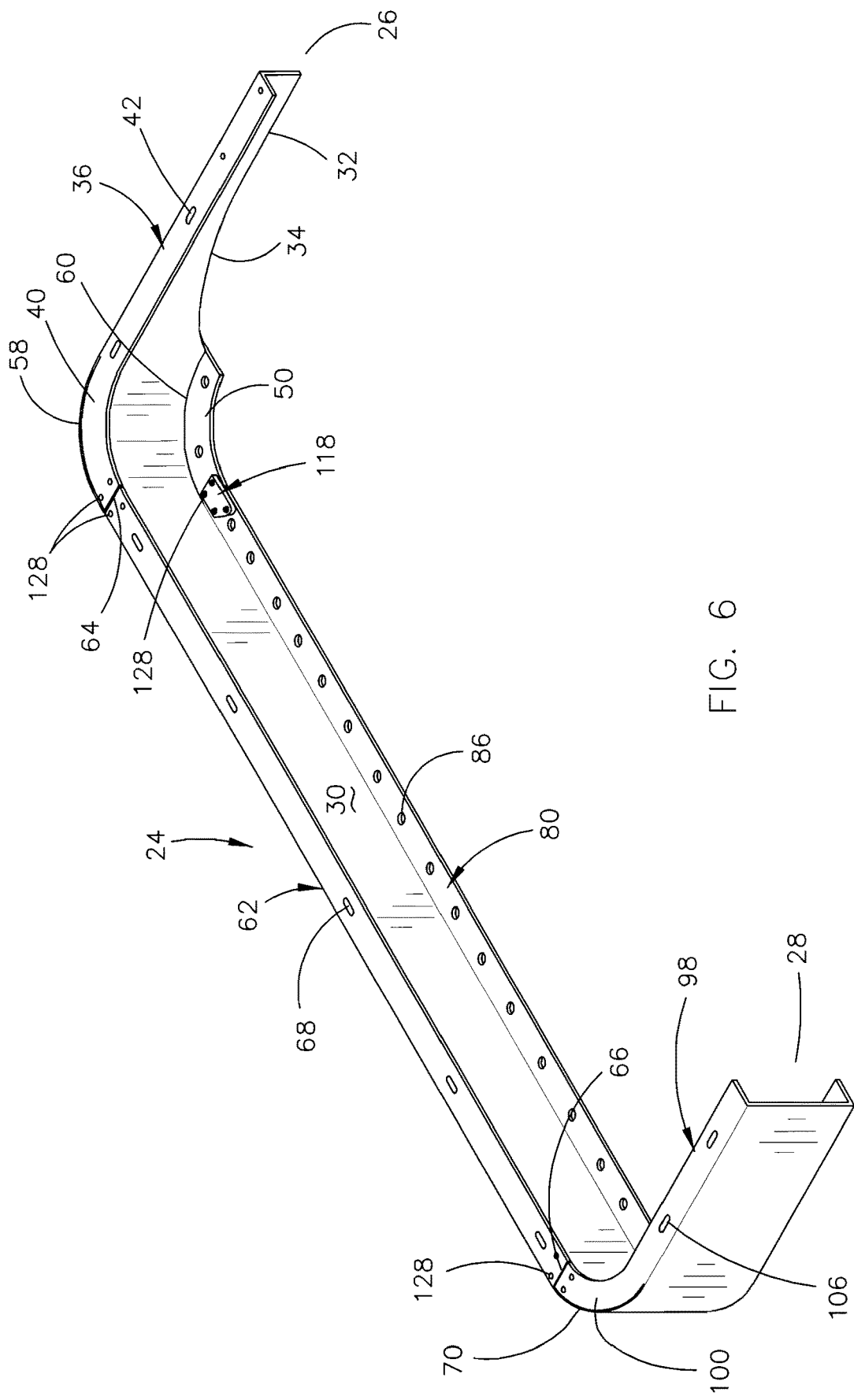
FIG. 6 is an inner perspective view of the passenger side sleeper panel after it has been bent and assembled.
Figure 7:
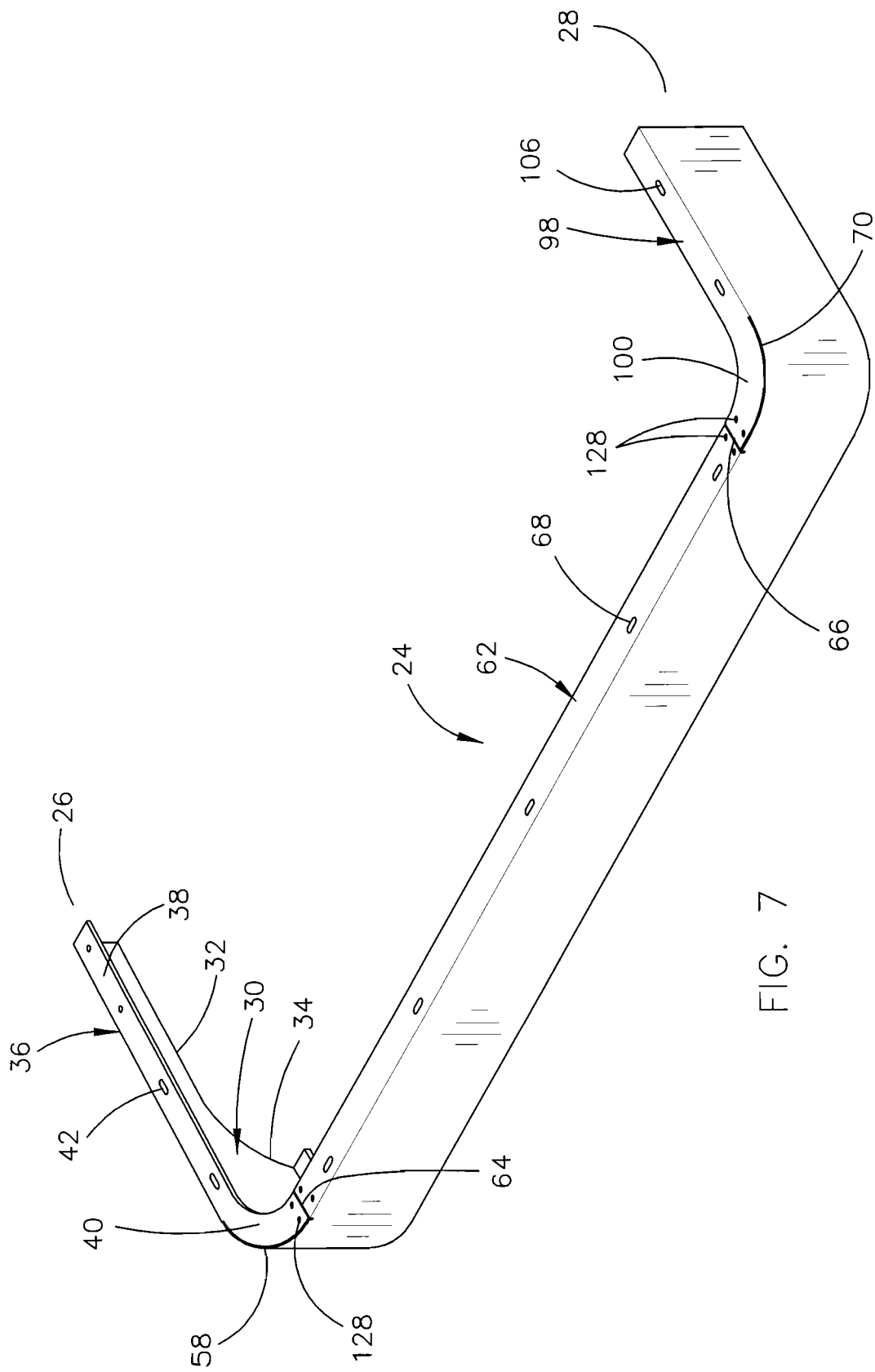
FIG. 7 is an outer perspective view of the passenger side sleeper panel of this invention after it has been bent and assembled.
Figure 8:
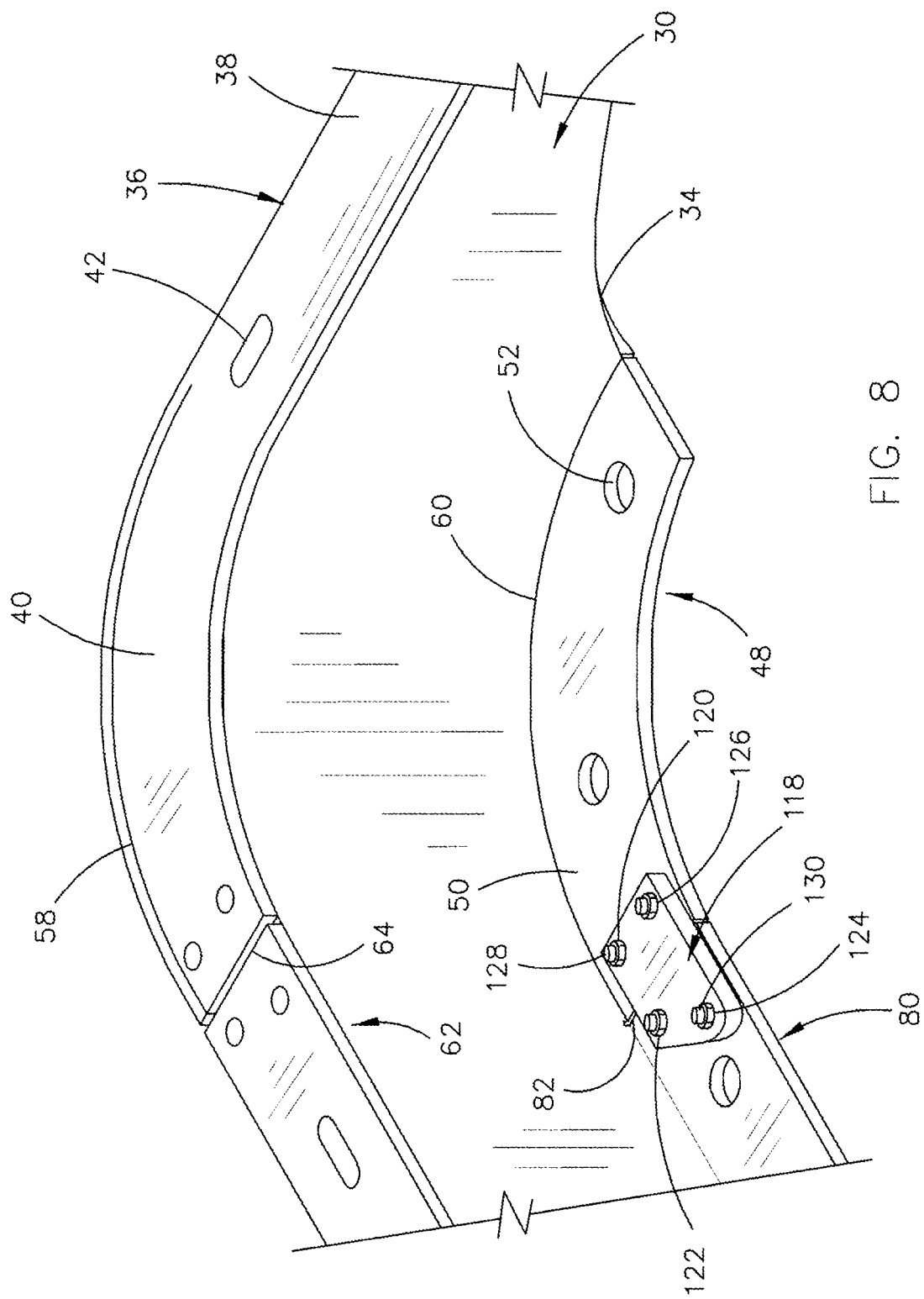
FIG. 8 is a partial perspective view illustrating the manner in which one of the end members of the passenger side sleeper panel is secured to one end of the side portion of the passenger side sleeper panel.

The numeral 24 refers to the sleeper panel of this invention. There will be a sleeper panel 24 at the passenger side of the truck and there will be a sleeper panel 24' at the driver side of the truck. The sleeper panel 24' at the driver side of the truck 10 is a mirror image of the sleeper panel 24 at the passenger side of the truck. As will be discussed hereinafter, the sleeper panel 24' at the driver side of the truck will not be described in detail with "'" indicating identical structure on the sleeper panel 24'. The sleeper panel 24 will be described in detail as it exists in FIG. 2 after being cut from a large sheet of metal and partially creased before it is bent and assembled into its final form. FIG. 3 illustrates the sleeper panel 24 after it has been partially bent. FIG. 6 illustrates the sleeper panel 24 in its bent and assembled form. FIG. 1 illustrates the sleeper panel 24 being secured to the lower end of the sleeper cab 12 as will be described in detail hereinafter.

Sleeper panel 24 is comprised of a metal material such as steel, stainless steel or aluminum and will have the exterior thereof painted or chromed. Sleeper panel 24 will be described as having a rear end 26 and a front end 28. Sleeper panel 24 includes a vertically disposed side wall 30. The side wall 30 of sleeper panel 24 has a straight lower edge portion 32 and an arcuate lower edge 34 formed therein at end 26 of sleeper panel 24. A top flange portion 36 extends transversely from the upper end of side wall 30 at end 26 of sleeper panel 24. Top flange portion 36 includes a straight portion 38 and a curved portion 40. Straight portion 38 of top flange portion 36 has a plurality of spaced-apart screw or bolt openings 42 formed therein. The end of curved portion 40 has a pair of bolt openings 44 and 46 formed therein.

A bottom flange portion 48 extends transversely from the lower end of side wall 30 and includes a curved flange portion 50. Bottom flange portion 48 has a plurality of optional spaced-apart openings 52 formed therein. The outer end of the curved flange portion 50 has a pair of bolt openings 54 and 56 formed therein.

The upper end of side wall 30 includes a side wall portion 58 which does not have a flange extending therefrom. The lower end of side wall 30 includes a side wall portion 60 which does not have a flange extending therefrom. Side wall portion 60 is located directly below side wall portion 58.

Sleeper panel 24 includes an elongated top flange 62, having ends 64 and 66, which extends from the upper end of side wall 30 and which has screw or bolt openings 68 formed therein. FIG. 2 illustrates the top flange 62 before it has been bent to the position of FIG. 3. End 64 of top flange 62 is positioned at the end of side wall portion 58. The end 66 of top flange 62 is positioned at one end of side wall portion 70 which does not have a flange extending therefrom. End 64 of top flange 62 has a pair of bolt openings 72 and 74 formed therein. End 66 of top flange 62 has a pair of bolt openings 76 and 78 formed therein.

Sleeper panel 24 includes an elongated bottom flange 80, having ends 82 and 84, which extends from the lower end of side wall 30 and which has optional openings 86 formed therein. FIG. 2 illustrates the bottom flange 80 before it has been bent to the position of FIG. 3. End 82 is positioned at the end of side wall portion 60. End 84 of flange 80 is positioned at one end of side wall portion 88 which does not have a flange extending therefrom. End 82 of bottom flange 80 has a pair of bolt openings 90 and 92 formed therein. End 84 of bottom flange 80 has a pair of bolt openings 94 and 96 formed therein.

The numeral 98 refers to a top flange portion at end 28 of sleeper panel 24. Top flange 98 has a curved flange portion 100 extending therefrom at the end of side wall portion 70. A pair of bolt openings 102 and 104 are formed in the outer end of flange portion 100. Top flange 98 has a plurality of screw or bolt openings 106 formed therein. The numeral 108 refers to a bottom flange at end 28 of sleeper panel 24. Bottom flange 108 has a curved flange portion 110 extending therefrom at the end of side wall portion 88. A pair of bolt openings 112 and 114 are formed in the outer portion of flange portion 110. A plurality of optional openings 116 are formed in flange 108.

Sleeper panel 24 includes four connector plates 118 each of which have four bolt openings 120, 122, 124 and 126 formed therein. The bolt openings 120, 122, 124 and 126 are configured to receive bolts 128 extending therethrough having nuts 130 mounted thereon. The numeral 132 refers to a connector plate which is secured to the top flange 38 and which is configured to be secured to the sleeper cab 12 by bolts or screws extending through the screw or bolt openings 134. The sleeper panel 24 is fabricated and assembled as will now be described. Assuming that the sleeper panel 24 is in the form of FIG. 2 with the flanges and flange portions having been creased, the flanges and flange portions thereof will be bent about their crease lines from the positions of FIG. 2 to the positions of FIG. 3. The front end 28, top flange 98, bottom flange 108, side wall portion 70 and side wall portion 88 will be bent with respect to end 66 of top flange 62 and end 84 of bottom flange 80 until the end of curved flange portion 100 abuts the end 66 of top flange 62 and until the end of curved flange portion 110 abuts the end 88 of bottom flange 80.

A connector plate 118 is then positioned at the underside of the openings 76, 78, 102 and 104. Bolts 128 are then extended through the registering bolt openings and secured therein by nuts 130. A connector plate 118 is then positioned on the upper sides of flange portion 110 and bottom flange 80. Bolts 128 are then extended through the registering bolt openings and secured therein by nuts 130. The two connector plates 118 securely maintain the components in the position of FIG. 6. When in the position of FIG. 6, there is a continuous flange which may be later secured to the lower end of the sleeper cab 12. The rear end 26, top flange 36, flange portion 40, side wall 30, bottom flange portion 48 will be bent from the position of FIG. 3 to the position of FIG. 6. A connector plate 118 is then positioned on the upper side of bottom flange 80 at end 82 thereof and the upper side of bottom flange portion 48. Bolts 128 are then extended through the registering openings in connector plate 118, bottom flange 80 and the curved flange portion 50. Nuts 130 are then secured to the bolts 128 to maintain the connector plate 118 in position. A connector plate 118 is also positioned at the underside of top flange 62 at end 64 thereof and the end of curved portion 40. Bolts 128 are then extended through the registering openings and nuts 130 are threadably mounted on the bolts 128.

The plates 118 securely maintain the components in the position of FIG. 6. When in the position of FIG. 6, a continuous upper flange is provided for attachment to the lower end of sleeper cab 12 so that the sleeper panel 24 will not become loosened during the operation of the truck. The sleeper panel 24 is then positioned below the sleeper cab 12 and secured thereto by bolts or screws extending through openings 42, 68 and 106. When so positioned, the fuel tank 22 is partially received by the arcuate edge 34. If so desired, the connector plate 132 may be used to further attach the sleeper panel 24 to the sleeper cab 12.

Figure 9:
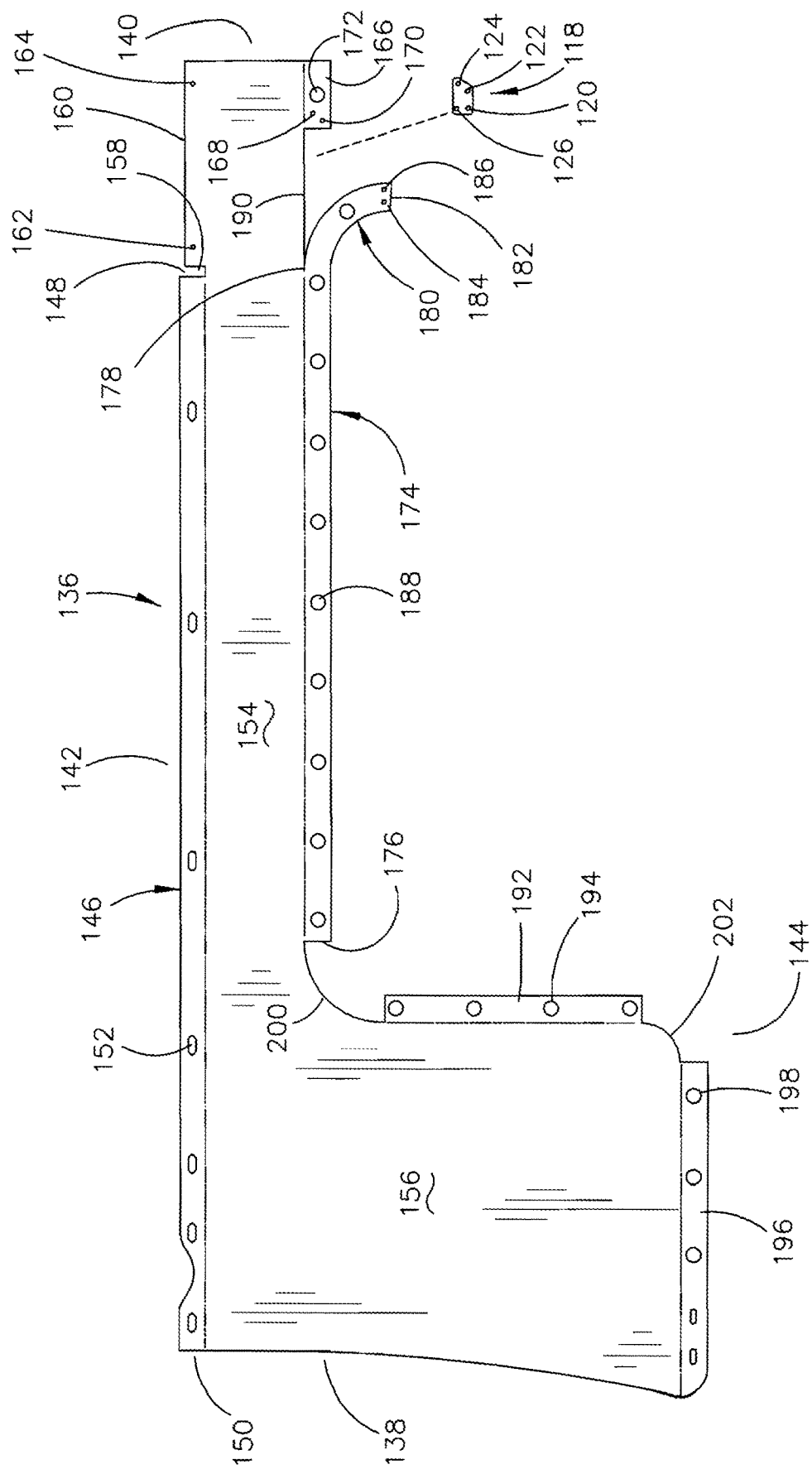
FIG. 9 is a plan view of the passenger side cab panel of this invention after it has been cut from a larger sheet of metal material and partially creased.
Figure 10:
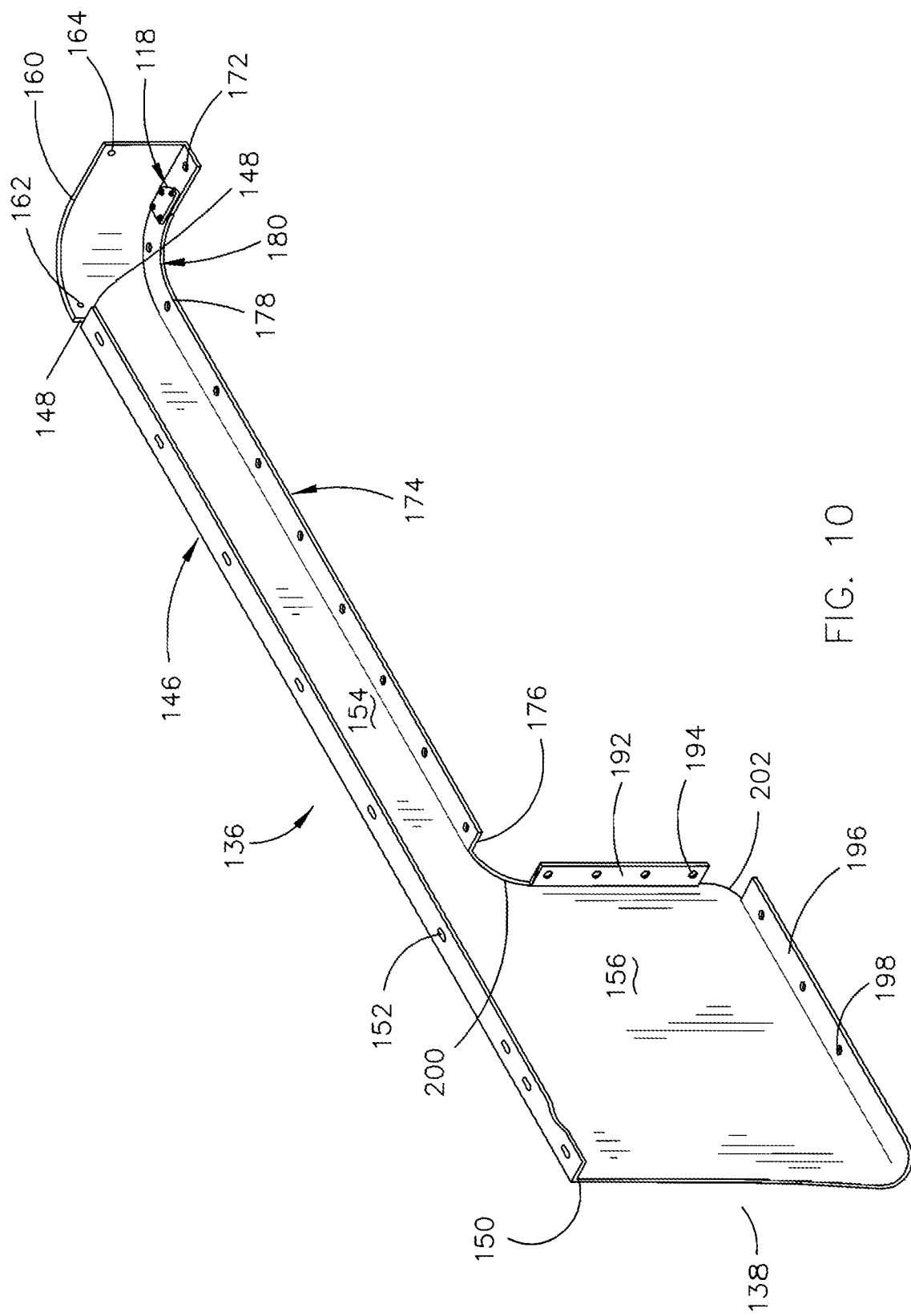
FIG. 10 is an inner perspective view of the passenger side cab panel of this invention after it has been bent.
Figure 11:
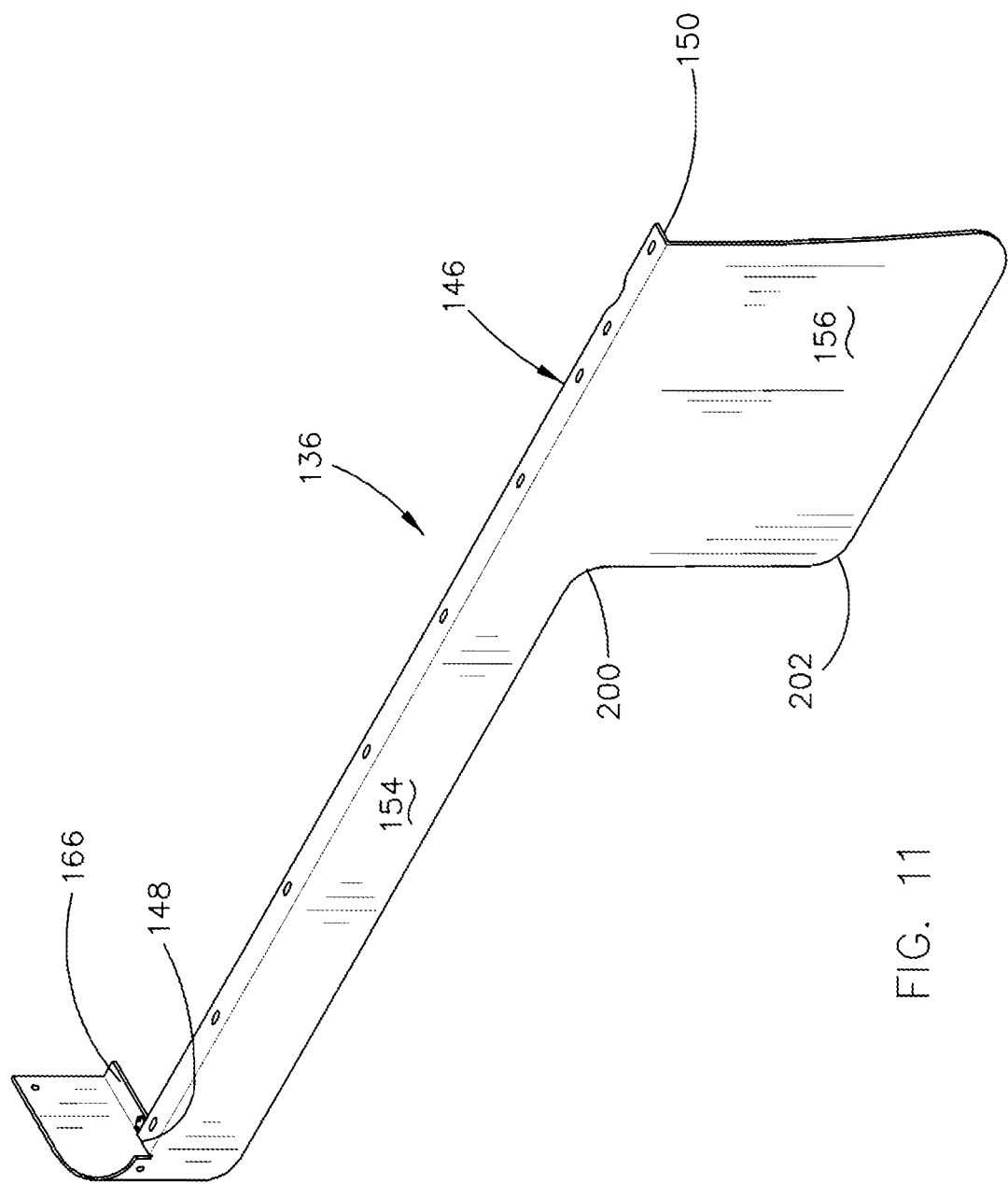
FIG. 11 is an outer perspective view of the passenger side cab panel of this invention after it has been bent and assembled.
Figure 12:
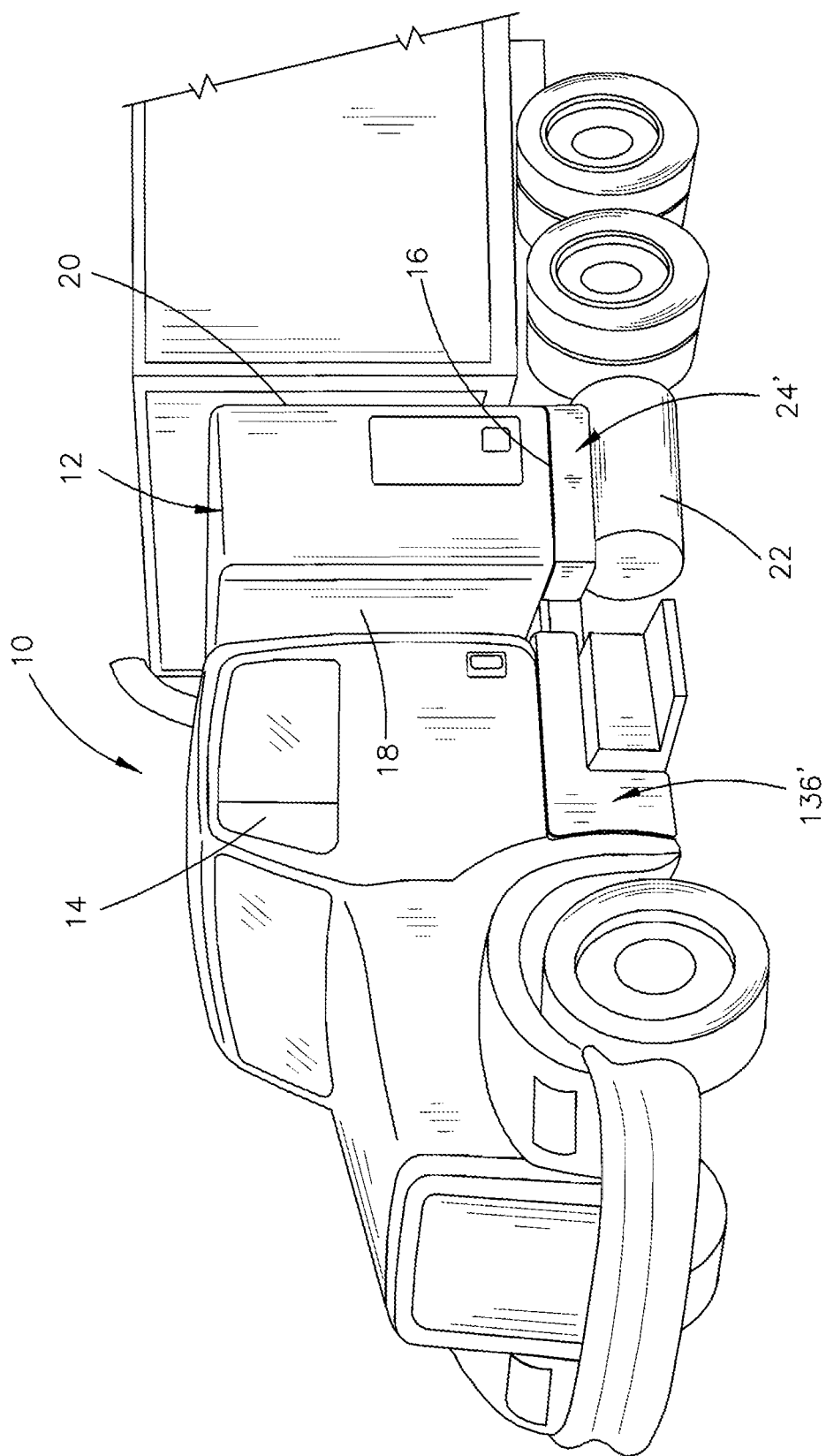
FIG. 12 is a partial perspective view of the driver side of the truck of FIG. 1 which has the driver side sleeper panel and the driver side cab panel secured thereto.
Figure 13:
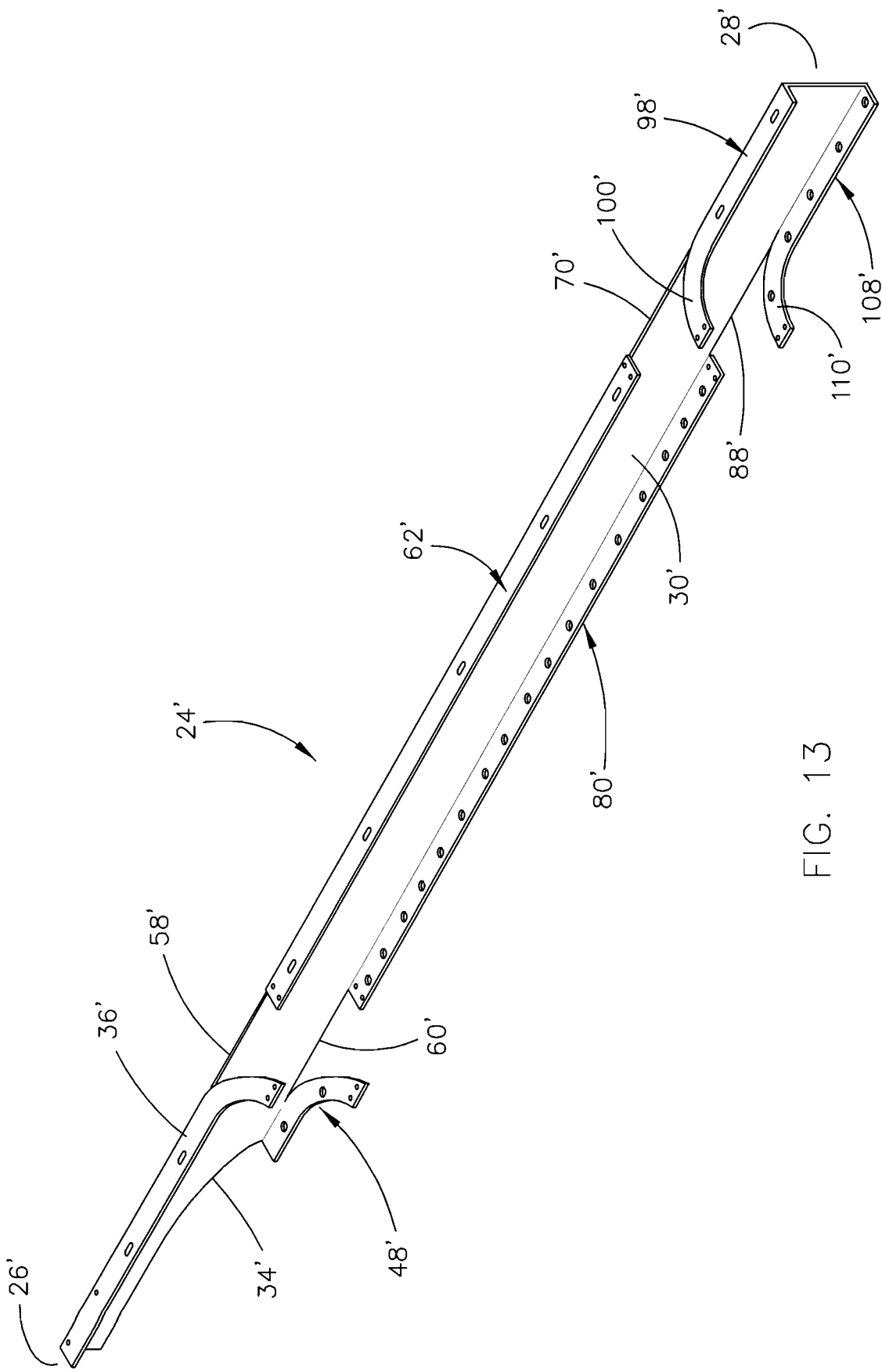
FIG. 13 is a front perspective view of the driver side sleeper panel as seen from the inner side thereof after it has been partially creased and bent.
Figure 14:
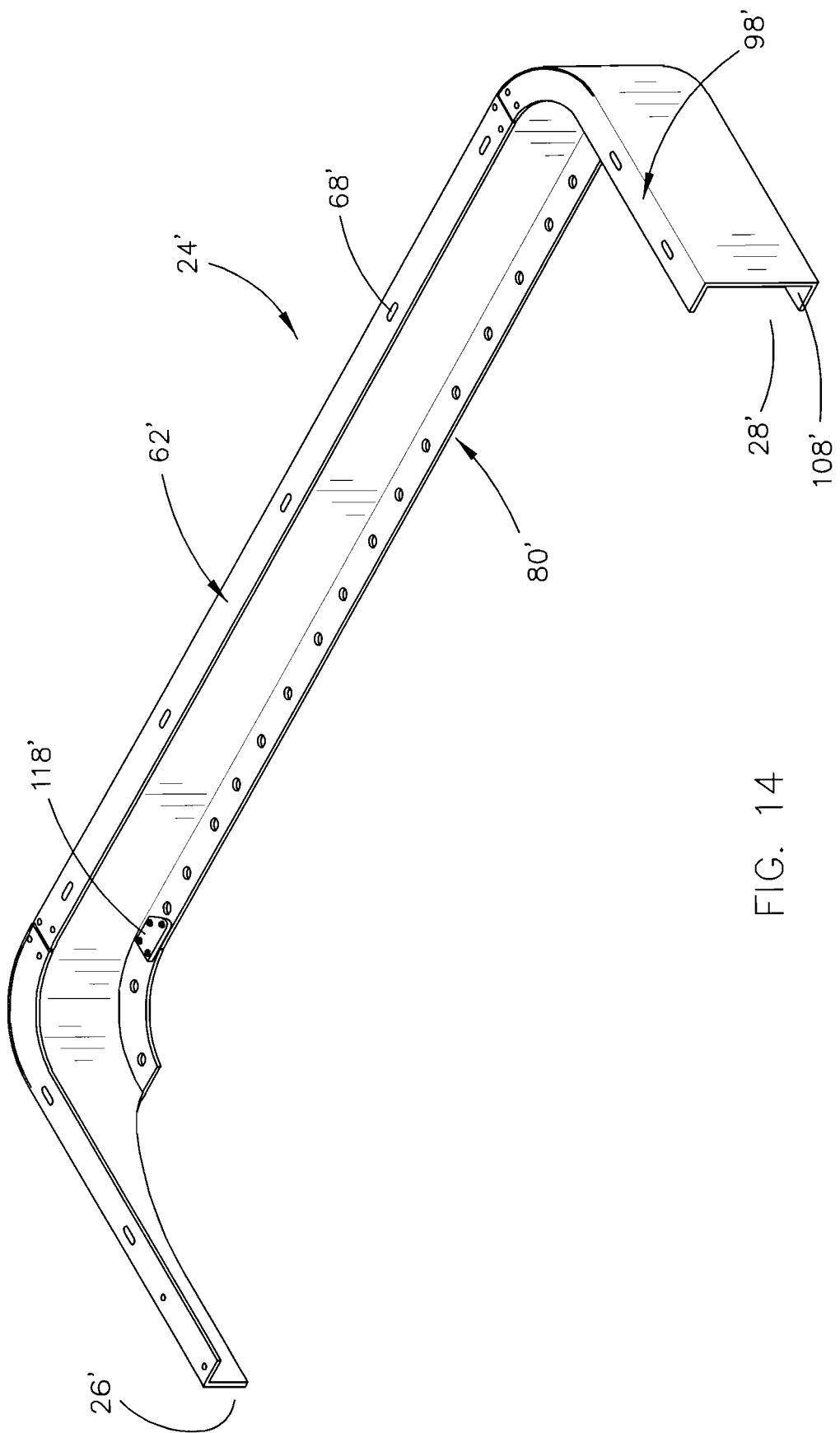
FIG. 14 is an inner perspective view of the driver side sleeper panel of FIG. 13 after it has been further bent and assembled.
Figure 15:
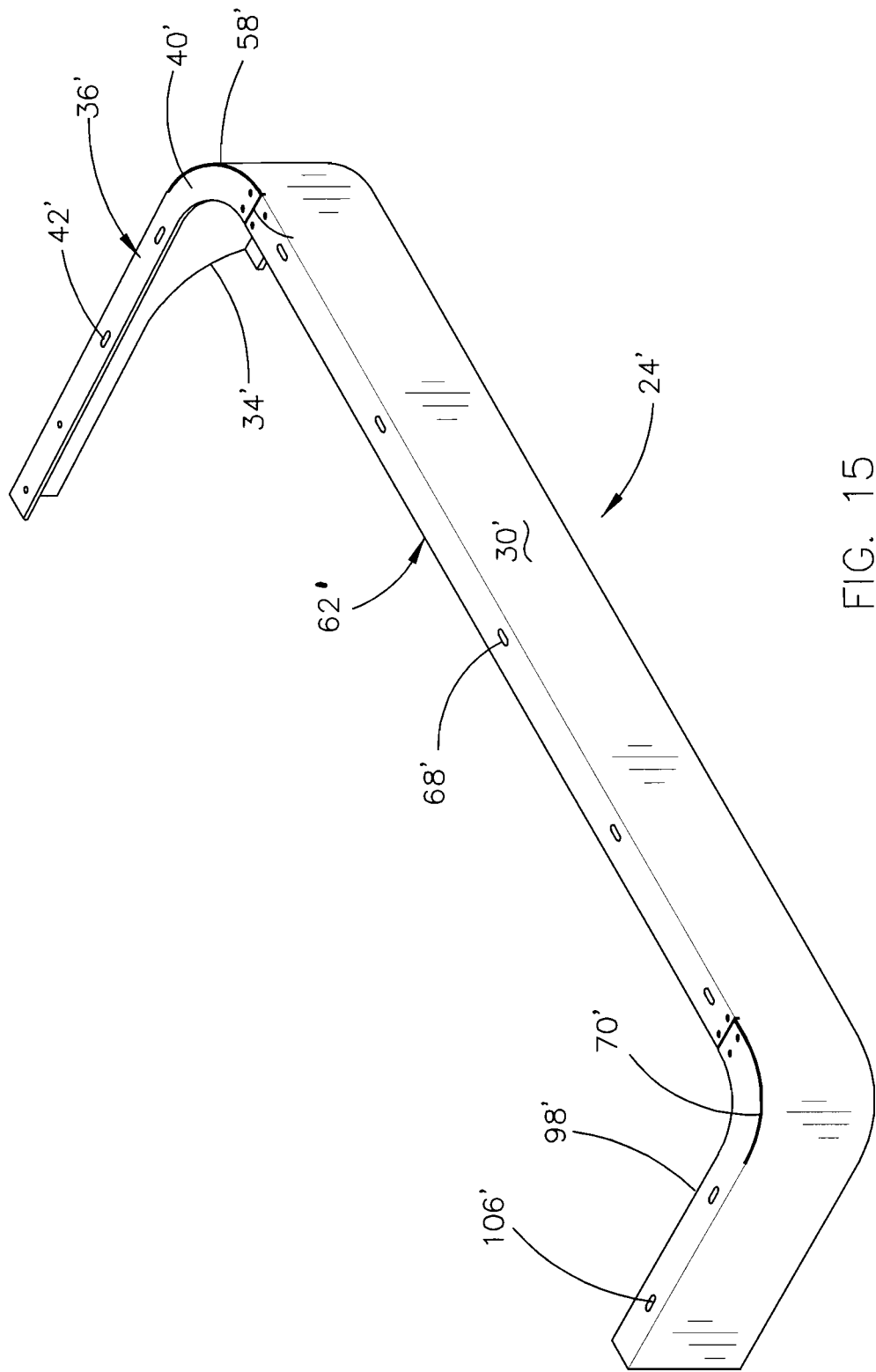
FIG. 15 is an outer perspective view of the driver side sleeper panel of FIG. 14.
Figure 16:
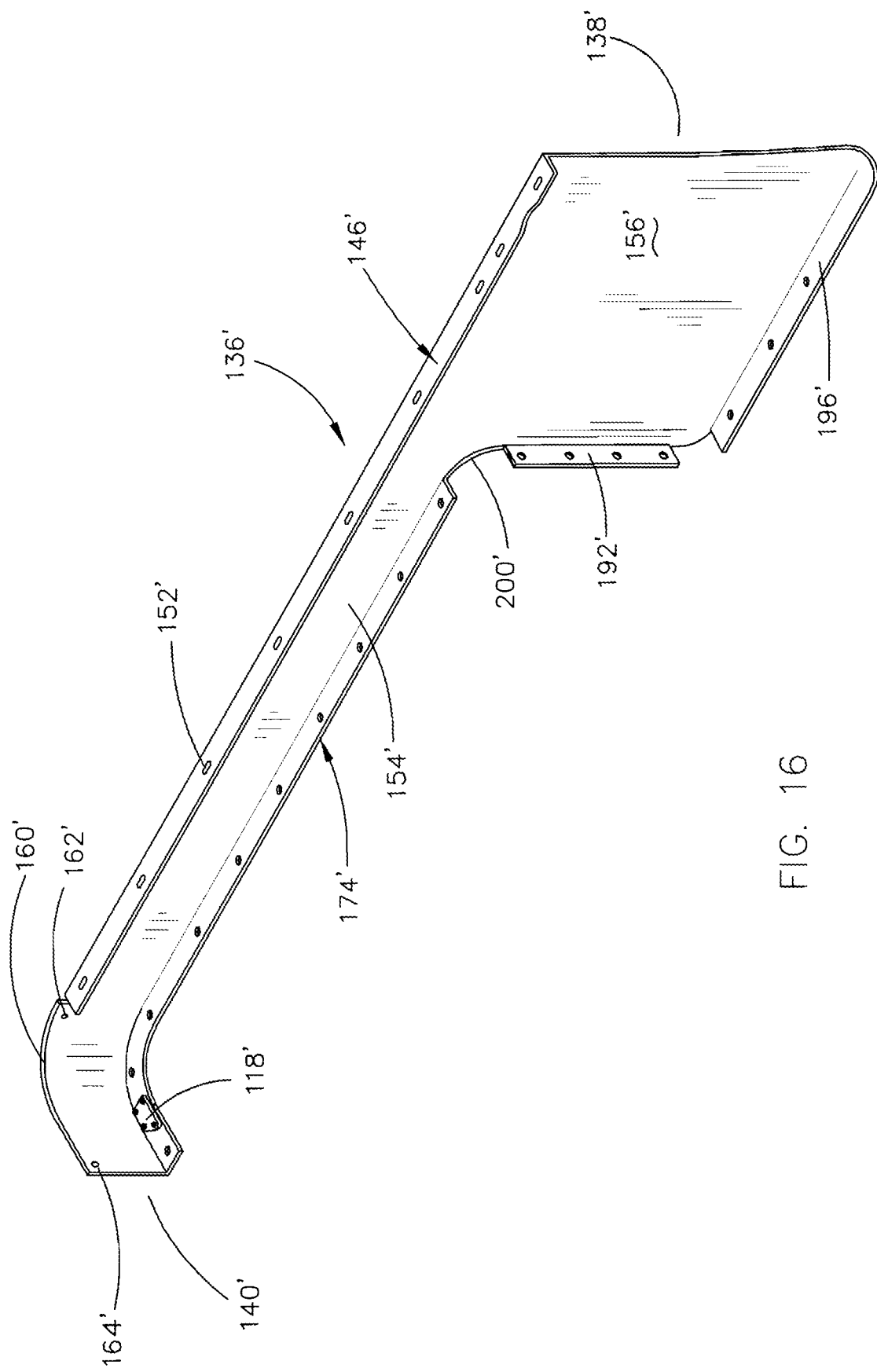
FIG. 16 is an inner perspective view of the driver side cab panel of this invention after it has been assembled.

FIGS. 9-11 illustrate the metal cab panel 136 which is secured to the passenger side of the truck cab 14. A cab panel 136', which is the mirror image of cab panel 136, will be secured to the driver side of the truck cab 14. Identical structure on cab panel 136' will be indicated by "'". FIG. 9 is an inner side view which illustrates the cab panel 136 after it has been cut from a larger metal sheet and partially creased. Cab panel 136 will be described as having a front end 138, a rear end 140, an upper end 142 and a lower end 144. Panel 136 includes a top flange 146 having a front end 150 and a rear end 148. Top flange 146 has a plurality of screw or bolt openings 152 formed therein. Side wall portions 154 and 156 extend downwardly from top flange 136 as seen in FIG. 9. The rear end of side wall portion 154 has a notch 158 formed therein at the rear end 148 of top flange 146. The upper rear end of side wall portion 154 has an upper edge 160. A pair of spaced-apart openings 162 and 164 are formed in side wall portion 154 at the upper end thereof. The lower rear end of side wall portion 154 has a short bottom flange portion 166 extending therefrom. Flange portion 166 has a pair of bolt openings 168 and 170 formed therein. Flange portion 166 also has a screw or bolt opening 172 formed therein.

The numeral 174 refers to a straight bottom flange having a first end 176 and a second end 178. The numeral 180 refers to a curved flange portion 180 extending outwardly therefrom which has an end 182. A pair of bolt openings 184 and 186 are formed in flange portion 180 inwardly of end 182 thereof. A plurality of optional openings 188 are formed in flange 174 and flange portion 180. As seen in FIG. 9, the lower end side wall portion 154 has a lower edge portion 190 which extends from end 178 of flange 174 and flange portion 166. A flange 192 extends from the side of side wall portion 156 and has a plurality of optional openings 194 formed therein. Cab panel 136 includes a connector plate 118 having bolt openings 120, 122, 124 and 126 formed therein.

A flange 196 extends from the lower end of side wall portion 156 and has a plurality of optional openings 198 formed. Side wall portion 156 has a semi-circular edge 200 formed therein at its upper rearward end. Side wall portion 156 also has a semi-circular edge 202 formed therein at its lower rearward end.

The cab panel 136 is similarly assembled into the position of FIG. 10. When in the position of FIG. 10, the cab panel 136 is maintained in that position by the connector plate 118. The end of side wall portion 154 may be secured to the underside of sleeper cab 12 by screws or bolts extending through openings 162 and 164. The top flange 146 is secured to the lower end of sleeper cab 12 by screws or bolts extending through the openings 152. Openings 188, 194 and 198 may be used to support lights therein.

Thus it can be seen that sleeper panels have been provided for attachment to a sleeper cab of a truck wherein the entire upper end of sleeper panels may be secured to the sleeper cab. The same is also true with respect to the cab panels of this invention.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A cab panel for a truck cab with the truck cab having a forward end, a rearward end, a passenger side, a driver side, an upper end and a lower end, comprising:
   a vertically disposed forward panel portion having an upper end, a lower end, a forward end, a rearward end, an inner side and an outer side;
   a horizontally disposed intermediate panel portion having a forward end, a rearward end, an upper end, a lower end, an inner side and an outer side;
   said upper ends of said forward panel portion and said intermediate panel portion having a horizontally disposed first flange extending transversely inwardly from said upper ends thereof;
   said first flange having a plurality of spaced-apart bolt or screw openings formed therein;
   said lower end of said intermediate panel portion having a horizontally disposed second flange, having a forward end and a rearward end, extending transversely inwardly from said lower end thereof;
   said second flange having an inwardly extending curved portion at said rearward end thereof;
   said second flange having a plurality of spaced-apart bolt or screw openings formed therein;
   said lower end of said forward panel portion having a horizontally disposed third flange extending transversely from said lower end thereof;
   said third flange having a plurality of spaced-apart screw or bolt openings formed therein;
   said rearward end of said forward panel portion having a vertically disposed fourth flange extending transversely inwardly therefrom;
   said fourth flange having a plurality of spaced-apart screw or bolt openings formed therein;
   a rearward panel portion having an inner end and an outer end;
   said rearward panel portion including a vertically disposed and curved side wall portion having an inner end, an outer end, an upper end and a lower end;
   said upper curved side wall portion of said rearward panel portion having a plurality of screw or bolt openings formed therein;
   a horizontally disposed fifth flange extending transversely forwardly from said curved side wall portion of said rearward panel portion;
   a connector plate secured to and extending between said fifth flange and said rearward end of said inwardly extending curved portion of said second flange; and
   said first, second, third, fourth and fifth flanges at said curved wall portion of said rearward panel portion being configured to be secured to the cab of the truck.

* * * * *